3,078,637
PROCESS FOR THE REMOVAL OF CARBON
DIOXIDE FROM ETHYLENE
Robert M. Milton, Buffalo, N.Y., assignor to Union
Carbide Corporation, a corporation of New York
No Drawing. Filed Nov. 27, 1959, Ser. No. 855,540
2 Claims. (Cl. 55—68)

This invention relates to a process for the removal of carbon dioxide from ethylene. More particularly, this invention relates to a process for the removal of carbon dioxide impurities from ethylene streams by selective adsorption employing a zeolitic molecular sieve.

This application is a continuation-in-part of my application No. 400,385, filed December 24, 1953, entitled "Process for the Adsorption and Separation of Fluids," now abandoned.

Polyethylene is an extremely useful compound produced by a relatively wide range of processes. However, in low pressure processes for producing polyethylene employing a catalyst, the presence of a carbon dioxide impurity in the raw material ethylene has had detrimental effects on said catalyst. Hence, it has been found to be extremely important to remove carbon dioxide from ethylene before initiating low-pressure polymerization. At present, carbon dioxide is removed from ethylene by scrubbing with monoethanolamine, but this method has proved to be unsatisfactory because of the corrosive nature of the amine vapors. Furthermore, the monoethanolamine vapors must also subsequently be removed from the ethylene gas stream.

It is the principal object of this invention, therefore, to provide an improved process for the selective adsorption of carbon dioxide from ethylene.

The object of this invention is accomplished by passing a stream of ethylene containing $CO_2$ impurities through a medium containing zeolite A molecular sieves having pore sizes of about 4 angstrom units or larger, at superatmospheric pressures and ambient and lower temperatures, whereby the carbon dioxide is selectively adsorbed by the molecular sieve. Following said adsorption step, a desorptive and regenerative step can be carried out at substantially atmospheric pressure.

The chemical formula for crystalline zeolite A may be written as follows:

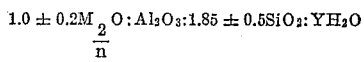

In this formula "M" represents a metal, "$n$" its valence and "Y" may be any value up to 6 depending on the identity of the metal and the degree of dehydration of the crystals. This composition is more fully described in my U.S. Patent No. 2,882,243.

When zeolite A is prepared by crystallization from aqueous reactant liquors containing sodium hydroxide, aluminate and silicate, the metal cation shown as "M" in the chemical expression above is sodium. The sodium form of zeolite "A" is characterized by possessing pore openings to internal adsorption areas, which pore openings have an effective size of about 4 angstroms. Ion-exchange of at least about 40% of the sodium cations to divalent alkaline earth metal cations increases the effective size of the pore opening to about 5 angstroms.

Among the ways of identifying zeolite A sieves and distinguishing them from other zeolites and other crystalline substances, the X-ray powder diffraction pattern has been found to be a useful tool. In obtaining the X-ray diffraction powder patterns, standard techniques were employed. The radiation was the K $\alpha$ doublet of copper, and a Geiger counter spectrometer with a strip chart pen recorder was used. The peak heights, $I$, and the positions as a function of 2 $\theta$, where $\theta$ is the Bragg angle, were read from the spectrometer chart. From these, the relative intensities, $$\frac{100\ I}{I_0}$$

where $I_0$ is the intensity of the strongest line or peak and $d$(obs), the interplanar spacing in A., corresponding to the recorded lines, were calculated.

Therefore, zeolite "A" may be defined as a synthetic crystalline aluminosilicate having an X-ray diffraction pattern characterized by at least those reflections set forth in the following Table 1:

TABLE 1 d Value of Reflection in A.

12.2±0.2
8.6±0.2
7.05±0.15
4.07±0.08
3.68±0.07
3.38±0.06
2.96±0.05
2.73±0.05
2.60±0.05

The zeolite A sieves contemplated herein exhibit adsorptive properties that are unique among known adsorbents. The common adsorbents, like charcoal and silica gel, show adsorption selectivities based primarily on the boiling point or critical temperature of the adsorbate. Activated zeolite A on the other hand, has a prime selectivity based on the size and shape of the adsorbate molecule. Among these adsorbate molecules whose size and shape are such to permit adsorption by zeolite A, a very strong preference is exhibited toward those that are polar, polarizable, and unsaturated. A third property characteristic of the zeolite A that contributes to its unique position among adsorbents is its property of adsorbing large quantities of adsorbate at very low pressures, at very low partial pressures, or at very low concentrations. One or a combination of one or more of these three adsorption characteristics or others can make zeolite A useful for numerous gas or liquid separation processes where adsorbents are not now employed, and by their use can permit more efficient and more economical operation of numerous processes now employing other adsorbents or in which the use of other adsorbents is contemplated.

In the aforementioned application Serial No. 400,385, isotherm data for single materials revealed the broad possibility of the preferential adsorption of carbon dioxide over ethylene on sodium zeolite A. However, it has now been found that any other ion exchanged form of zeolite A having a pore size of at least about 4 angstroms could also be used for this purpose. However, for the practice of this invention, it has been found preferable to employ a crystalline calcium type zeolite A having a pore size of at least about 4 angstrom units but preferably of about 5 angstrom units.

In the present process, the ion-exchanged form of zeolite "A" in which at least about 40% of the sodium cations have been exchanged to calcium, magnesium, or strontium is preferred because the process stream is principally ethylene with carbon dioxide present as a minor constituent. Since both molecules are adsorbed, the adsorption capacity of the zeolite will initially be filled with an adsorbate similar in composition to the ethylene-carbon dioxide mixture being purified. Continued contact then permits the more strongly adsorbed carbon dioxide molecule to displace the less strongly held ethylene molecule. It is apparent that the rate of that displacement will be greater when the passages into the internal adsorption zones are sufficiently open. Hence a pore size of 5 angstrom units is preferred.

In the preferred embodiment of this invention, therefore, a process for removing $CO_2$ impurities from mixture with ethylene comprises providing a calcium exchanged zeolite A having a pore size of about 5 angstrom units and, at high pressure and about ambient temperatures, intimately mixing said zeolite with said mixture of ethylene and $CO_2$. Following this step, the zeolite can be desorbed and regenerated by simultaneous atmospheric or higher pressure purge gas and high temperature treatment. A continuous operation is preferably carried out by cyclically employing at least two adsorbent beds.

In accordance with the above, therefore, the process may be operative at any pressure above about 25 p.s.i.g. and any temperature below about 40° C. However, higher pressures and lower temperatures improve the loading obtainable.

In this regard, the adsorption conditions should preferably range from between 100 and 500 pounds per square inch pressure, and the temperatures employed should range between 15 and 30° C. This will give an ethylene product stream containing less than 25 p.p.m. $CO_2$. The temperature at which the desorption of the adsorbate from the zeolite may be carried out will generally vary according to the pressure or partial pressure employed or according to the concentration of the adsorbate. Where the ethylene gas stream contains sufficient water so that the water loading of the adsorbent will be substantial the regeneration temperature may be raised to 350° C. to expedite the regeneration. The desorption and regeneration step is preferably carried out, however, by the use of a purge gas at temperatures of up to about 250° C. or better and at atmospheric pressure. The temperature of regeneration will be directly proportional to the amount of water content of the raw material ethylene. Hence, a higher amount of water content would necessitate a higher regeneration temperature.

It might occasionally be necessary for the regeneration temperature to be taken above 350° C. but not above the thermostability temperature of the sieve which is about 565° C. Above the latter temperature the essential crystalline structure will begin to suffer destruction. Temperatures above 350 but below 550 may be called for in order to remove residues such as would be formed from polymerization reactions by the ethylene.

The criteria for a satisfactory purge gas are: (1) dryness, (2) cleanliness, (3) no containment of components capable of being adsorbed to any appreciable extent at the desorbing conditions, and (4) no containment of components which may react with or be polymerized by the adsorbent at the desorbing conditions. Examples of such purge gases are nitrogen, the rare gases, hydrogen, methane or mixtures thereof.

The process of this invention will be more easily understood by reference to the following illustrative examples: The first two examples describe a two-step process using one adsorbent bed under different operating conditions. The third example employs two adsorbent beds in illustrating a continuous cyclic purification system:

EXAMPLE I

Ethylene containing 0.725 vol.-percent carbon dioxide was passed through an 0.855 pound bed of dehydrated calcium-exchanged zeolite 5A (about 70 percent calcium exchanged) at conditions of 100 pounds per square inch and at a temperature of 25-30° C. The space velocity through the adsorbent bed was gradually increased from 190 to 325 volumes of gas per volume of adsorbent per hour. During this time, the concentration of carbon dioxide in the effluent gas remained essentially constant at 0.006 volume percent (60 p.p.m.). Saturation of the bed with carbon dioxide was reached after about 40 cu. ft. of ethylene per pound of adsorbent had been treated. At this point, the total amount of carbon dioxide adsorbed was 3.6 weight percent of the adsorbent weight. Ethylene adsorption amounted to 7.5 weight percent.

The above calcium zeolite A bed which had been loaded with carbon dioxide and ethylene was regenerated by passing dry methane at atmospheric pressure through the zeolite bed at a space velocity of about 55 volumes per volume of adsorbent per hour. (For the purposes of this invention the term "dry methane" denotes methane whose dew point does not exceed about 35° C.) The bed temperature was then raised to about 200° C. for a period of 2 hours for the regeneration step. Following cooling of the bed to the adsorption temperature of about ambient the purification process may then be repeated in a cyclic fashion.

EXAMPLE II

The procedure described in Example I above, was repeated with the exception that space velocity approaching 455 volumes of gas per volume of adsorbent per hour was attained during the run. The average bed temperature was therefore about 14° C. instead of about 25° C. as in Example I, due to the cooling of the gas by a high rate of withdrawal from the feed cylinder. The carbon dioxide content of the adsorbent at the end of the run was 4.0 weight percent and the ethylene content was 7.0 weight percent. The carbon dioxide content of the effluent gas varied from 0.0004 volume percent (4 p.p.m.) to 0.0008 volume percent (8 p.p.m.).

Regeneration was then carried out as described in Example I above.

EXAMPLE III

A stream of 1,300,000 cu. ft. per day of ethylene containing 0.3 volume percent carbon dioxide was passed into one of two adsorbent beds, each containing about 5000 pounds of dehydrated calcium-exchanged zeolite A. The adsorption of carbon dioxide and some ethylene was carried out at essentially atmospheric temperature and under a pressure of about 500 pounds per square inch. The heat of adsorption was removed by the circulation of water through cooling coils located in the bed. This was necessary to avoid raising the bed temperature and hence lowering the adsorbent capacity. The adsorption cycle continued for about 12 hours, during which time the dry carbon dioxide-free ethylene product gas passed directly to an ethylene polymerization unit.

After the bed had become loaded with carbon dioxide, the ethylene input stream was switched to a fresh adsorbent bed and the adsorber chamber vented to atmospheric pressure. This adsorber was then regenerated by passing steam through the bed heating coils and by purging the bed with a small quantity of a dry hydrogen-methane gas mixture. The bed temperature was increased to about 150–160° C. over a regeneration period of 4 hours.

The adsorber was then cooled by circulating water through the bed coils, purged with ethylene to remove traces of the hydrogen-methane gas mixture, and brought up to a pressure of 500 p.s.i.g. with ethylene. The complete 24 hour cycle for adsorber operations is listed below.

*Cycle for a Given Adsorbent Bed*

| Service: | Hours |
|---|---|
| Adsorption | 12 |
| Blowdown of ethylene pressure | 1 |
| Desorption of bed | 4 |
| Cooling of absorber | 5 |
| Purging, pressuring and final cooling | 2 |
| | 24 |

Several runs were also made employing 250 to 400 p.s.i.g. Space velocities of as high as 875 volumes of gas per volume of adsorbent per hour were obtained at the higher pressure, while the increase in the amount of $CO_2$ adsorbed went from 3.6 to 4.2 weight percent at 400 p.s.i.g. Similar increases in ethylene weight loadings were also observed.

Table 2 below presents data from these runs listed in chronological order as Examples IV through X. The adsorbent used in the 400 and 250 p.s.i.g. runs was subsequently used in a 100 p.s.i.g. run as a check on the efficiency of regeneration, and the resultant obtained value of 3.7 percent weight loading of $CO_2$ was in line with the values from the earlier runs. The regenerating procedure consisted of raising the bed temperature to about 200° C. while passing methane over it at a space velocity of about 40.

This feature is clearly indicated in Table 3 which appears below:

TABLE 3

| Adsorbate | Pressure (mm.Hg) | Temperature (° C.) | Weight Percent Adsorbed | | |
|---|---|---|---|---|---|
| | | | Na₂A. | Charcoal | Silica Gel |
| Carbon dioxide | 50 | 25 | 15.3 | 2.2 | 1.3 |

What is claimed is:

1. A process for the removal of carbon dioxide from mixture with ethylene which comprises providing a zeolite

TABLE 2

| Examples | 4 | 5 | 6 | 7 | 8 | 9 | 10 |
|---|---|---|---|---|---|---|---|
| Type of Sieve | 5A | 5A | 5A | 5A | 5A | 5A | 4A |
| Fresh or Regenerated | Regen. | Regen. | Fresh | Regen. | Regen. | Regen. | Fresh |
| Bed Depth, in | 19 | 19 | 16 | 16 | 16 | 16 | 24 |
| Pressure, p.s.i.g | 100 | 100 | 400 | 400 | 250 | 100 | 100 |
| Temperature, °C | 25–30 | 25–30 | 25–30 | 25–30 | 25–30 | 25–30 | 25–30 |
| Space Velocity, vols./vol./hr | 300 | 410 | 875 | 800 | 640 | 560 | 400 |
| Vol. Percent $CO_2$ in Feed | .75 | .75 | .75 | .75 | .75 | .75 | .75 |
| Vol. Percent $CO_2$ in Outlet | .0020 | .0004 | .0008 | .0004 | .0013 | .0008 | .0077 |
| C.f. of Gas Treated per lb. of adsorbent | 41 | 49 | 54 | 52 | 51 | 43 | 37 |
| Wt. Percent $CO_2$ Adsorbed | 3.6 | 4.2 | 4.7 | 4.7 | 4.5 | 3.7 | 3.0 |
| Wt. Percent $C_2H_4$ Adsorbed | 7.5 | 7.0 | 9.9 | 8.8 | No Measure Taken | | |
| Partial Pressure $CO_2$ in inlet, mm. of Hg | 45 | 45 | 155 | 155 | 97 | 45 | 45 |
| Equilibrium Adsorption of $CO_2$, Wt. Percent | 13.2 | 13.2 | 17.0 | 17.0 | 15.6 | 13.2 | 11.0 |
| Percent of Equilibrium Attained | 26.8 | 31.3 | 27.7 | 27.7 | 28.8 | 28.0 | 27.3 |

It should be noted that Example X was run with a fresh charge of type 4A sieve. The $CO_2$ adsorbed was about 80% of the $CO_2$ adsorbed using a type 5A sieve.

It should also be noted that a particularly advantageous feature of this invention is that $CO_2$ adsorptions are now possible at temperatures formerly impossible with common adsorbents such as carbon and gels. For example, it is known that at temperatures where carbon dioxide has appreciable vapor pressure, silica gel is not effective. The best temperature for silica gel $CO_2$ adsorption is below −80° C. and just above the $CO_2$ solidifying temperatures. Hence, the process of this invention has the surprising advantage of being operable at temperatures substantially higher than heretofore known.

A having a pore size sufficiently large to receive the carbon dioxide molecule, and intimately mixing said zeolite A and said mixture of carbon dioxide and ethylene.

2. A process for the removal of carbon dioxide from mixture with ethylene which comprises providing a calcium-exchanged zeolite A and intimately mixing said calcium-exchanged zeolite A and said mixture of carbon dioxide and ethylene.

References Cited in the file of this patent

UNITED STATES PATENTS

| 2,519,874 | Berg | Aug. 22, 1950 |
| 2,522,426 | Black | Sept. 12, 1950 |
| 2,899,474 | Ricards | Aug. 11, 1959 |

OTHER REFERENCES

Petroleum Refiner Article, volume 36, No. 7, July 1957, pp. 136–140.